Dec. 25, 1928.  M. A. McKAY ET AL  1,696,278
AUTOMOBILE LOCK
Filed May 23, 1927
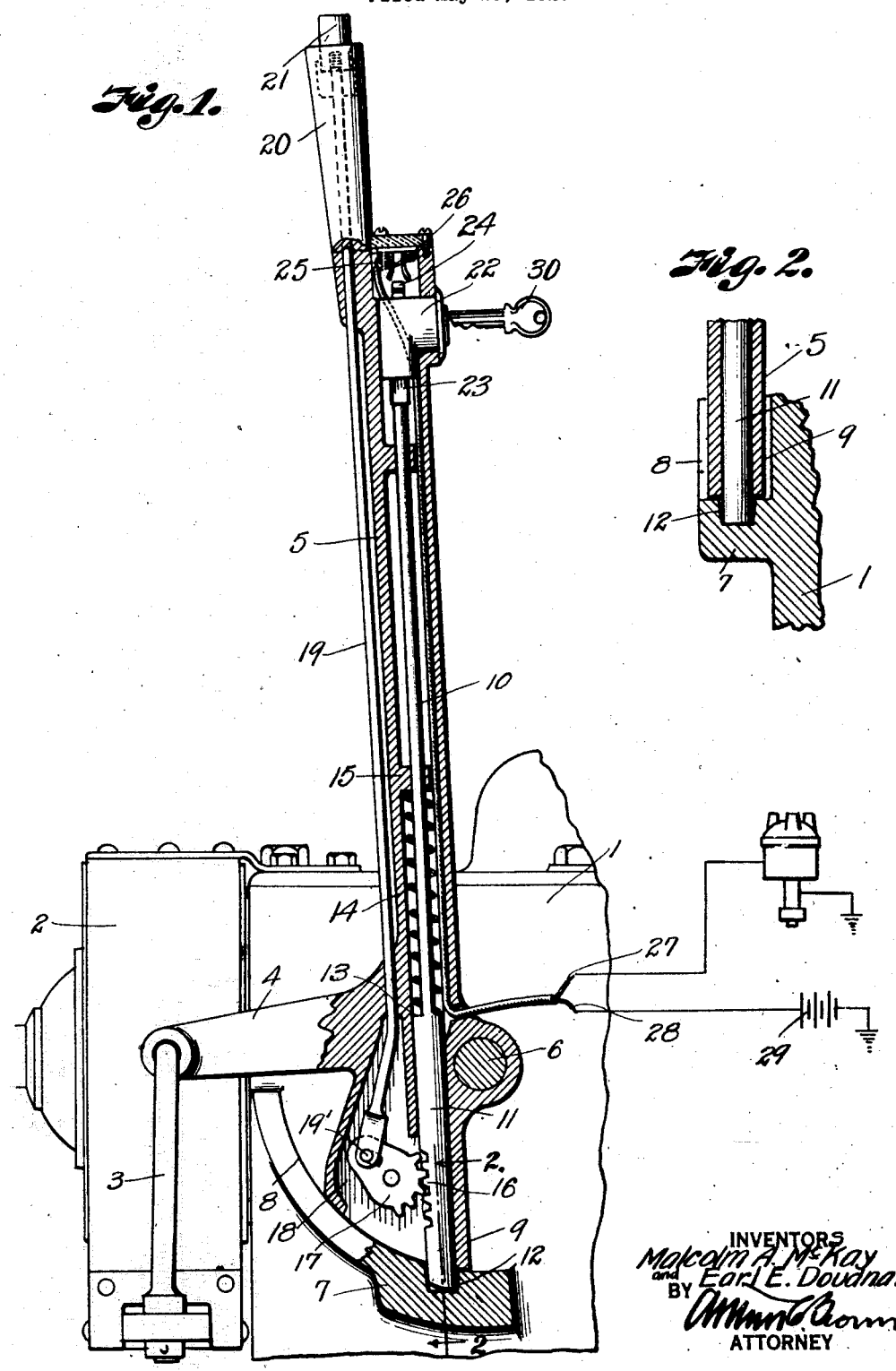
INVENTORS
Malcolm A. McKay
and Earl E. Doudna.
BY
ATTORNEY Patented Dec. 25, 1928.

1,696,278

UNITED STATES PATENT OFFICE.

MALCOLM A. McKAY, OF KANSAS CITY, MISSOURI, AND EARL E. DOUDNA, OF KANSAS CITY, KANSAS.

AUTOMOBILE LOCK.

Application filed May 23, 1927. Serial No. 193,406.

Our invention relates to automobile brakes and more particularly to locking devices having ignition-interrupting features.

Our object is to provide a lock for an emergency brake in which a key locks the brake and at the same time disrupts the ignition circuit, and whereby the releasing of the lock by the key establishes the ignition circuit and also permits the releasing of the brake.

We accomplish our object by providing a device comprising improved details of structure and having co-operating elements which will be particularly described with references to the drawings wherein:

Fig. 1 is a view partly in section of our device positioned as functioning in an automobile.

Fig. 2 is a vertical sectional view of the latching members on the line 2—2, Fig. 1.

Referring in detail to the drawings:

1 designates the transmission case and 2 in general a standard propeller shaft brake served by the link 3 and the actuating arm 4 of the brake lever 5 pivoted on the pintle 6 fixed in the transmission housing. A lug or boss 7 having an arcuate face suggested by 8 receives the rocking lower end 9 of the emergency brake lever as it pivots on the pintle 6, this lower end being given a number because it will be referred to as enlarged and having features associated with the lug 7.

The brake lever constitutes a housing for the brake bolt 10 provided with an enlarged end 11 constituting a latching member for reception by the recess 12 in the said lug of the transmission case, and producing the shoulder 13 against which a spring 14 bears. The spring is anchored against a boss 15 interiorly projected in the housing to normally force the bolt into the recess of the lug 7 to brake the car, when the lever is pivoted to bring the bolt into coincidence with the recess. The said bolt is withdrawn from engagement in the recess by manual means now to be described. Rack teeth 16 are provided on the enlarged portion 11 of the bolt, which are meshed with a pivoting sector 17 pivotally mounted within a chamber 18 of the lever, the sector being actuated by a rod 19 pivotally connected with the sector by the frangible pin 19', the rod projecting to the upper end of the lever and through the lever handle 20. Pressure on the button 21 depresses the rod 19 to rock the sector 17 to raise the bolt so that the lever end can be moved over the face of the lug, and the bolt be retained on the lug out of latching engagement therewith.

Our structure so far recited suggests that the movement of the brake lever will permit the brake bolt to seat in the recess and lock the car. We now wish to disclose another particular subject of our invention which is the means of locking the brake in set position and coincidentally breaking the ignition circuit of the engine.

A lock 22 is installed in the upper end of the brake lever housing which actuates a bar 23 having an upwardly extending contact member 24; the lock being of a type in common use adapted for retaining its key except at one position of the range of movement of the tumbler barrel, and the arrangement of parts in the present case being one wherein the turning of the key for locking the car can occur only when the brake bolt is seated and therefore spaced from the lock so that the bar 23 being projected by the rotation of the key extends downwardly to and impinges on the end of the bolt to lock it in braking position. At the same time the member 24 is withdrawn downwardly, such withdrawal being away from engagement with the terminals 25 and 26 of wires 27 and 28 leading to the battery diagrammatically indicated as 29.

It is apparent therefore that the locking of the brake disrupts the ignition circuit, the withdrawal of the key 30 therefore assuring that there shall be no possibility of a stranger putting the engine into actuation or releasing the brake. The opposite functioning of the key in the lock withdraws the bar 23 from locking the brake rod and establishes the member 24 in functioning position as connecting the terminals of the circuit and permitting the ignition circuit to function. The brake bolt, however, must be manually removed from engagement.

We wish to point particularly to the manual displacement of the brake bolt from braking position since our structure therefore permits the setting up of the ignition and engine-actuating steps prior to removing of the braking condition, and as long prior as desired. That is to say, a driver may stop his car on a hillside, may lock and leave it there and upon returning may have his engine in condition to engage the clutch before the brake is released.

Because of the key locking arrangement of the device, the key cannot be removed while the ignition circuit is established by the member 24, nor while the emergency brake is in inactive position. It occurs, therefore, that the motorist must set his emergency brake in order to permit the lock to be actuated so that the key may be removed.

The lock disclosed prevents the moving of a car from the place in which it may be parked without the unlocking of the brake and the restoration of ignition means by the key of the owner.

We wish also to suggest that it is now possible to provide a structure of the simplicity and certainty of action disclosed herein because of the use of propeller brakes. We devise our invention for application to the propeller brake, and because of this we can construct a housing wherein the braking elements can be completely protected from mischievous curiosity.

Additional factors of safety may be provided as suggested by mechanical ingenuity, for example, the provision of a button 21 of material that is easily distorted, so that a blow on the button in a malicious effort to dislodge the brake would merely deform the button; or, as implied above, break the frangible pivot pin 19'. The rod may be constructed of material easily bent, whereby a similar result would follow tampering as suggested.

What we claim and desire to secure by Letters Patent is:

1. In a locking device for motor vehicles, a housing constituting the brake lever, a bolt in the housing, means on the transmission case to receive the bolt, a key-actuated lock having a bar projectible against the bolt to lock it in position, means whereby said bar closes the ignition circuit of the vehicle upon withdrawal from engagement with the bolt, and means for withdrawing the bolt operable when the key releases the lock.

2. In a locking device for motor vehicles, a housing constituting the brake lever, a bolt in the housing, a lug on the transmission housing having a recess to receive the bolt, the brake lever being rotatively slidable over the lug, a key-actuated lock having a bar projectible against the bolt to lock it in position as received by said recess, means whereby said bar closes the ignition circuit of the vehicle upon withdrawal from engagement with the bolt, and means for withdrawing the bolt operable when the key unlocks the lock comprising a rack segment, a handle rod actuating the segment, and teeth on the bolt meshing with said segment.

3. In a locking device for motor vehicles, a hollow brake lever, a bolt in the lever, means for engaging the bolt with the transmission housing, key-actuated means to lock the bolt in engaged position, and means for withdrawing the bolt comprising teeth on the bolt, and a toothed member meshed with said teeth.

4. A locking device for emergency brakes, comprising a bolt slidable in the brake lever, means for engaging the bolt with a housing element of a car, key-actuated means for locking the bolt in engaged position comprising a bar projectible against the bolt and a member engaged with ignition circuit contacts in unlocked position of the means and withdrawn from engagement with said contacts in locked position of said means.

5. In combination with the ignition circuit and the emergency brake of an automobile having a brake actuating lever, a locking mechanism for locking the lever in braking position comprising a bolt slidable in the lever, a keeper for the bolt, key-actuated means for locking the bolt in the keeper and means actuated by the key-actuated means for opening and closing the ignition circuit.

6. In combination with the ignition circuit and the brake of an automobile, a brake-actuating lever, a keeper for holding the lever in set position, key-actuated means for locking the lever in set position, and means actuated by the key-actuated means for opening and closing the ignition circuit when the lever is in set position.

In testimony whereof we affix our signatures.

MALCOLM A. McKAY.
EARL E. DOUDNA.